July 28, 1925.
W. G. HOUSKEEPER
GRID MAKING MACHINE
Filed Dec. 15, 1923
1,547,754
2 Sheets-Sheet 1
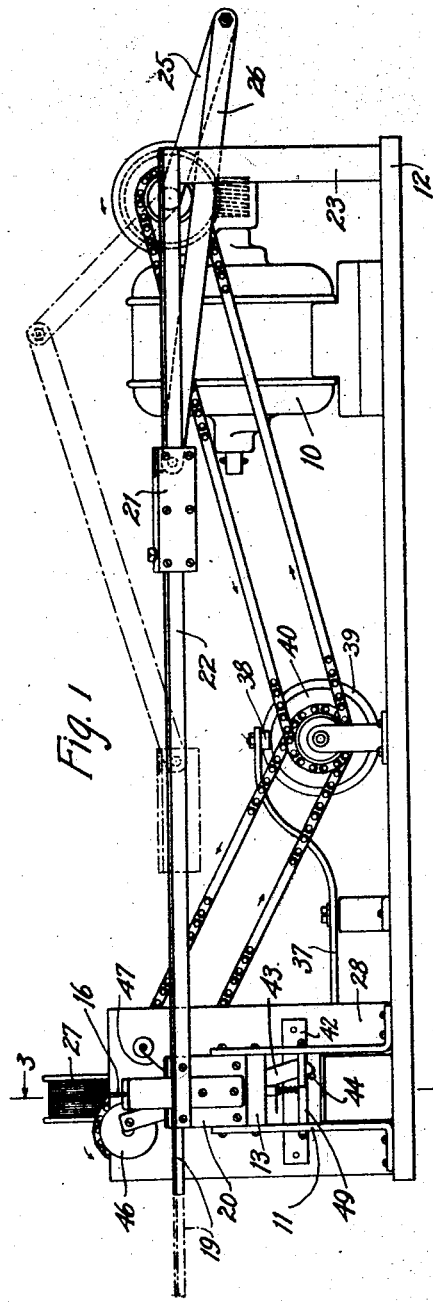
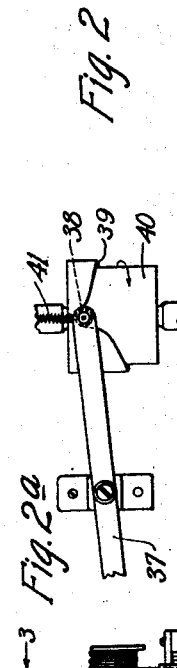
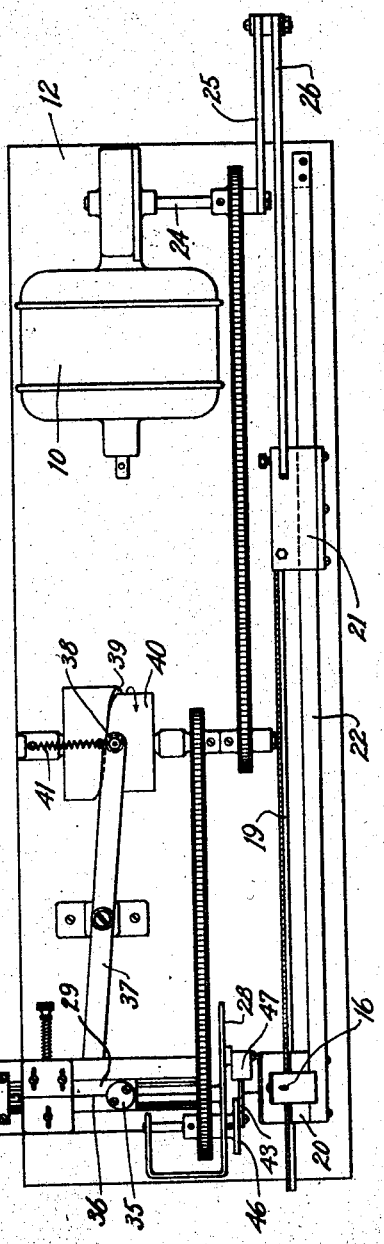
Inventor:
William G. Houskeeper,
by _____ Atty July 28, 1925.
W. G. HOUSKEEPER
GRID MAKING MACHINE
Filed Dec. 15, 1923  2 Sheets-Sheet 2
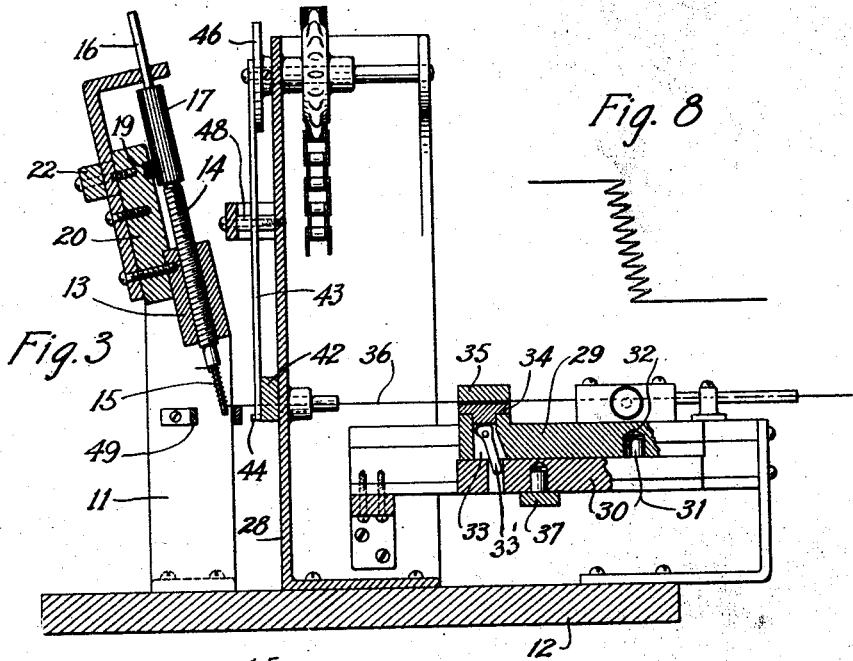
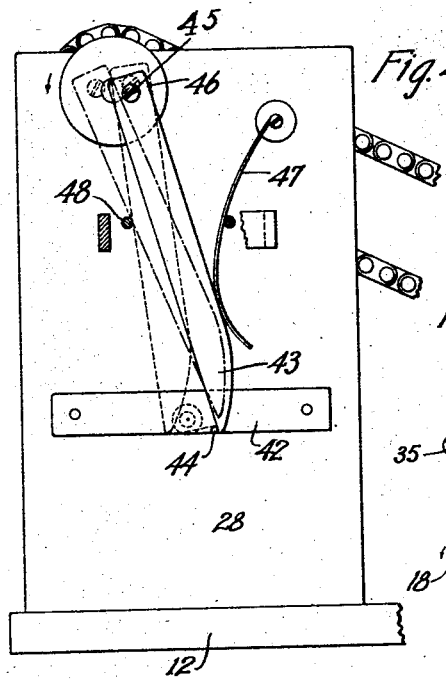
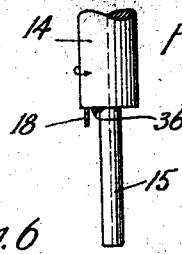
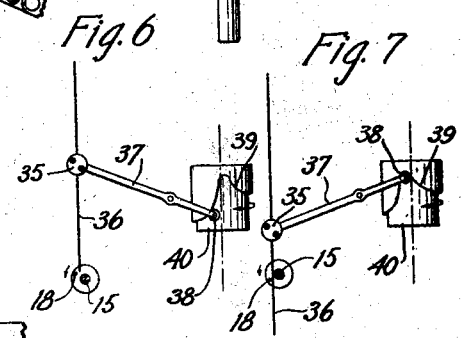
Inventor:-
William G. Houskeeper,
by _____ Att'y Patented July 28, 1925.

1,547,754

UNITED STATES PATENT OFFICE.

WILLIAM G. HOUSKEEPER, OF EAST ORANGE, NEW JERSEY, ASSIGNOR TO WESTERN ELECTRIC COMPANY, INCORPORATED, OF NEW YORK, N. Y., A CORPORATION OF NEW YORK.

GRID-MAKING MACHINE.

Application filed December 15, 1923. Serial No. 680,817.

*To all whom it may concern:*

Be it known that I, WILLIAM G. HOUS-KEEPER, a citizen of the United States of America, residing at East Orange, in the county of Essex and State of New Jersey, have invented certain new and useful Improvements in Grid-Making Machines, of which the following is a full, clear, concise, and exact description.

This invention relates to the manufacture of grid electrodes for vacuum tubes and has for its object to produce finished electrodes from a continuous length of wire.

In my copending application, Serial No. 671,353, filed Oct. 29, 1923, there is disclosed an electron discharge device provided with a grid electrode comprising a wire helix having its ends extending tangentially in opposite directions, and it is to the manufacture of this type of grid electrode that this invention is directed.

The object of the invention is accomplished by providing a rotating and reciprocating mandrel, having means at one end to receive the end of a wire from which the grid is to be made. After the wire has been received within this means, the mandrel is rotated and moved axially to wind the wire helically thereon. When a sufficient length of wire has been wound on the mandrel to form a grid, the wire is cut, and the mandrel rotated in the opposite direction and moved axially back to its original position. During this operation the grid is removed from the mandrel and the machine is ready for another cycle of operations.

Referring now to the drawings, Figure 1 is a side elevation of a machine embodying the invention, Fig. 2 is a plan view thereof, Fig. 2ª is a detail of Fig. 2 with the parts in reversed position, Fig. 3 is a vertical section, partly in elevation, on the line 3—3 of Fig. 1, Fig. 4 is a face view of the wire cutting means, Fig. 5 is a detail of the mandrel, Figs. 6 and 7 are schematic views illustrating the feed of the wire to the mandrel, and Fig. 8 is a perspective view of grid made by the machine.

This machine comprises, essentially, the mandrel and its operating mechanism, the wire feeder and its operating mechanism, and the wire cutting means and its operating mechanism. These three units are all driven from a common source of power 10, such as an electric motor, through the medium of mechanical power transmitting means, so that the various units operate to perform their functions sequentially.

A frame-work 11 rests upon and is attached to a bed 12 and provides a support for a block 13 having an aperture extending therethrough the surface of said aperture being provided with a preferably right hand screw thread. Arranged within the aperture is a screw threaded shaft 14 which projects beyond either end of the block 13. The lower end of the shaft 14 is reduced in diameter to provide a smooth surface cylindrical mandrel 15. The opposite end of the shaft is also reduced in diameter and is slidably mounted in a bracket 16 carried by the frame-work 11. Between the bracket 16 and the end of the screw threaded portion of the shaft is provided a wide pinion 17. Projecting from the lower end of the shaft 14 is a pin 18 which is arranged parallel to the mandrel 15 but spaced slightly therefrom.

A rack 19 has one end slidably mounted in the block 20 supported by the frame 11 and the other end attached to a carriage 21 slidably mounted upon a guide 22 extending from the frame 11 to a second frame 23 carried by the bed 12 at its opposite end. The teeth of the rack 19 mesh with the teeth of the pinion 17. A shaft 24 is journaled in a support carried by the bed 12 and is driven by the motor 10 through the medium of a worm-drive. A crank arm 25 is attached to the shaft 24 to rotate therewith, and the end thereof is connected by a link 26 with the carriage 21.

It is evident from the above that the rotation of the shaft 24 will result in a reciprocation of the carriage 21 and a consequent rotation of the pinion 17, first in one direction and then in the other. The shaft 14 rotates with the pinion 17 and will, therefore, be moved axially by virtue of its screw threaded engagement with the block 13, first in one direction and then in the other. The combined rotation and axial movement of the shaft 14 is permitted by the sliding engagement of its upper end with the bracket 16 and by virtue of the extreme width of the pinion 17 as compared with the rack 19. The wire from which the helix is to be made is fed between the pin 18 and the mandrel 15 in a manner to be later described and is wound around the mandrel as the latter is rotated and moved axially. This wire is preferably fed in a horizontal plane and the axis of the mandrel is inclined to the vertical so that the upper angle between the wire and the mandrel axis in the direction of the feed of the wire will be obtuse. The axis of the mandrel is placed so that the angle between it and the plane of the wire corresponds to the pitch angle desired in the helix to be formed. This arrangement insures the obtaining of the desired pitch angle through the length of the helix.

To accomplish the feeding of wire to the mandrel 15 there is provided a support (not shown) for a reel of wire 27, the wire being led through straightening and feeding means to the mandrel through an aperture in a frame 28 carried by the bed 12, this aperture being in alinement with the upper end of the mandrel 15 when the latter is in its lowermost position. The feeding of the wire is accomplished by the reciprocation of a feeding mechanism comprising a wire gripper mounted upon a carriage 29 which is slidably mounted upon a block reciprocatively supported by a framework carried by the bed 12. The carriage 29 is capable of a slight movement relative to the block 30 by virtue of a lost motion connection which comprises a pin 31 carried by the block 30 and extending into a socket 32 in the carriage 29, the socket 32 being of larger diameter than the pin 31. An aperture 33 extends through the carriage 29, and in the upper end thereof is arranged a plug 34. A cap 35 rests on the plug 34 and is attached to the carriage 29 by means of bolts passing through the plug 34, the arrangement being such that the plug 34 is movable toward and away from the cap 35 to a limited degree. The cap 35 and the plug 34 together constitute the wire gripper. In the aperture 33 is mounted a lever having one arm extending into a socket in the block 30 in such a manner that relative movement of the carriage 29 and the block 30 will actuate the lever. The opposite end of the lever is provided with a cam surface arranged to bear against the under face of the plug 34, so that if the lever be swung toward the frame 28, the plug 34 is moved against the cap 35, but if the lever is swung in the opposite direction the plug 34 is free to drop by gravity away from the cap 35.

The wire 36 from the reel 27 passes between the plug 34 and the cap 35, so that when the feeding mechanism is moved toward the support 28 the wire will be gripped and fed forward, but upon movement away from the frame 28 the wire passes freely between the plug and cap.

The block 30 is actuated by means of a lever 37 having a pin and slot connection therewith, the other end of the lever being provided with a roller 38 which engages a cam surface 39 on a drum 40 driven from the shaft 24 by means of a chain belt or similar arrangement. A spring 41 exerts tension on the lever 37 to keep the roller 38 in engagement with the surface 39. The design of the surface 39 is such that, starting from the position shown in Fig. 2ª, the lever 37 will be actuated slowly to move the carriage 29 to the right and maintain it retracted until the drum has nearly completed one revolution, at which point the surface 39 inclines slightly to allow a sufficient movement of the lever to slide the block 30 to the left a distance sufficient to actuate the lever 33' to effect a gripping of the wire between the plug 34 and the cap 35. The surface then slopes abruptly to allow the spring 41 to cause a quick movement of the lever 37 in a direction to advance the block 30 and feed the wire 36 to the mandrel.

Between the feeding mechanism and the mandrel is arranged a wire-cutting mechanism which comprises a die 42 through which the wire passes and a knife 43 which is mounted to slide over the face of the die 42. One end of the knife 43 normally rests against a pin 44 to maintain it in inoperative position, and the other end thereof is pivotally connected to a crank pin 45 on the crank disk 46 driven from the shaft of drum 40 through the medium of a link belt or other similar connection. A spring 47 is provided to thrust the knife 43 across the die to sever the wire when it is released from the pin 44. A second pin 48 is provided to limit the thrust of the knife and also to assist in the return of the knife to its normal position. The operation of this knife will be apparent from an examination of Fig. 4. The position shown in solid lines is the inoperative position where the point of the knife is engaged with the pin 44. As the crank disk 46 rotates counter clockwise the knife is pulled upwardly until the point thereof clears the pin 44, at which time the spring 47 thrusts it across the die 42 to sever the wire, the pin 48 limiting its throw. The arrangement of the pin 48 is such that the knife completely clears the die 42. Further rotation of the crank disk 46 brings the pivoted end of the knife further to the left, and the pin 48 acts as a fulcrum to the knife so that the point of the knife is lifted above the die and swung to the right of the pin 44. As the crank shaft rotates further the knife slides along the pin 48 until its point again engages the pin 44. The spring 47 is sufficiently stiff that operating on the comparatively small mass of the knife 43 causes the latter to pass over the die 42 with a velocity so high in comparison to the movement of the wire 36 that there is no perceptible interruption in the feeding of the wire. This arrangement makes this type of knife particularly adapted in connection with a continuously moving wire as it obviates the possibility of the wire buckling during the cutting operation.

Assuming that the machine is in operation, and beginning with the arrangement of the elements as shown in Fig. 3, the operation is as follows:

The wire is severed by the operation of the knife, as previously described. At this time the rack 19 is at the limit of its reciprocation to the right and is just ready to be retracted. Upon retraction of the rack the shaft 14 is rotated in such a direction that the mandrel 15 is moved downwardly to bring its upper end in alignment with the wire 36. The severing of the wire has relieved the tension of the wire previously wound on the mandrel 15, and the helix thus formed drops off by gravity. A stop 49 is provided to be engaged by the lower end of the helix as it swings around after the wire is severed so that this end cannot be jammed against the die when the tension of the helix is released by the cutting operation. As the mandrel 15 is being fed downward the wire-feeding mechanism has been brought into its right hand position ready to feed the wire forward, has gripped the wire and has fed is slightly toward the mandrel. When the rack 19 has reached the limit of its movement to the left the pin 18 bears to the mandrel 15 and the wire 36, the relation shown in Fig. 6 and the crank 25 is in the position opposite to that shown in full lines in Fig. 2. Thus, for a short period of time, while the crank 25 is rotating, there is very little movement of the rack 19 and consequently the relative positions of 15 and 18 remain practically the same for a brief interval. During this interval the roller 38 reaches the sharp incline of the surface 39, and the lever 37 is operated to move the carriage 29 to the left, resulting in a quick thrust of wire 36 between the pin 18 and the mandrel 15. The rack 19 then moves to the right, rotating the shaft 14 in a direction to cause axial movement thereof upwardly. The pin 18 binds the wire 36 against the mandrel and as the mandrel is elevated the wire is wound there-around in a helical form. When the mandrel reaches its limit of elevation the crank disk 46 has been rotated sufficiently to free the lower end of the knife from the pin 44 to allow the severing of the wire.

Preferably the mandrel 15 is so spaced from the cutting mechanism and the extent of feed of the feeding mechanism is so determined that there is provided at each end of a helix wound on this machine a tangentially projecting end. The starting and final positions of the mandrel relative to each other are preferably such that these ends extend in opposite directions from each other.

It is understood, of course, that various modifications may be made in the structure and arrangement of the various elements of this device without in any way departing from the spirit of the invention as set forth in the appended claims.

What is claimed is:

1. A grid winding machine comprising a frame, a mandrel carried by said frame, means to supply wire horizontally to said mandrel, said mandrel being inclined to the vertical at an angle corresponding to the pitch angle desired in the resultant helix, and means for simultaneously rotating and moving said mandrel axially.

2. A grid winding machine comprising a mandrel inclined to the vertical, means for feeding wire horizontally to said mandrel, and means for simultaneously rotating and moving said mandrel axially.

3. A grid winding machine comprising a mandrel, means to feed a wire horizontally to said mandrel, said mandrel being inclined to the vertical so that the angle between the wire and the axis of the mandrel in the direction of feed of the wire is obtuse, and means for simultaneously rotating and moving said mandrel axially.

4. A helix winding machine comprising a frame, a mandrel mounted on said frame, means for feeding wire horizontally to said mandrel, means for simultaneously rotating and moving said mandrel axially, and means for severing said wire in one position of said mandrel, said mandrel being inclined to the vertical whereby the wire is fed thereto at the pitch angle desired in the helix wound on the mandrel.

5. A helix winding machine comprising a mandrel inclined to the vertical, means for feeding wire horizontally to said mandrel, means for simultaneously rotating and moving said mandrel axially, and means for severing said wire in one position of said mandrel.

In witness whereof, I hereunto subscribe my name this 11 day of December A. D., 1923.

WILLIAM G. HOUSKEEPER.